March 8, 1927. 1,619,913
S. BARUCH
ANTIRATTLING DEVICE
Filed May 28, 1926
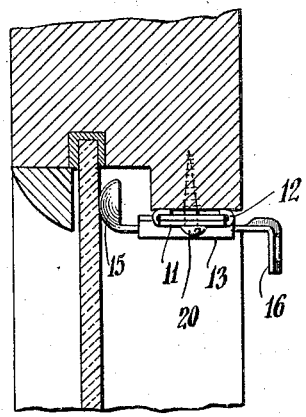
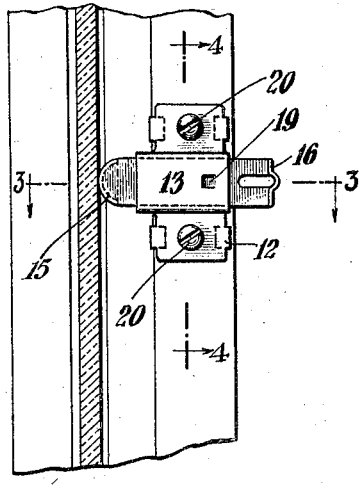
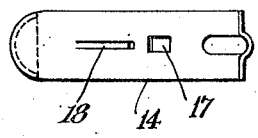
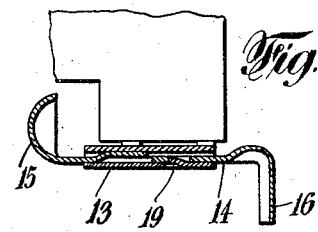
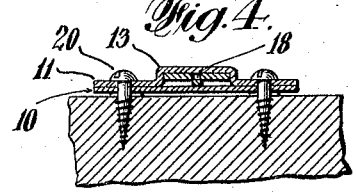
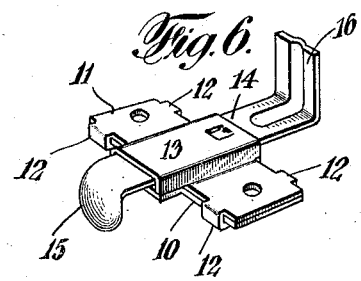
Inventor
Samuel Baruch
By his Attorneys Patented Mar. 8, 1927.

1,619,913

UNITED STATES PATENT OFFICE.

SAMUEL BARUCH, OF NEW YORK, N. Y.

ANTIRATTLING DEVICE.

Application filed May 28, 1926. Serial No. 112,203.

This invention relates to anti-rattling devices and more particularly to a type adapted for use in connection with the slidable panes of glass used in connection with vehicle windows and doors.

The main object of my invention is to provide a simple and inexpensive device which may be formed from stamped sheet metal parts readily assembled and easily applied. In my improved construction there are only three parts, two of which are secured together to form a base and guide for the third part which is slidable into or out of engagement with the pane of glass or other part to be retained.

In the accompanying drawings I have illustrated one embodiment of my invention. In these drawings:

Fig. 1 is a section of a portion of a window casing showing my improved device in edge view.

Fig. 2 is another section of a window casing showing the device in plan view.

Figs. 3 and 4 are sections on the lines 3—3 and 4—4 respectively of Fig. 2.

Fig. 5 is a plan view of the slide removed from the other parts, and

Fig. 6 is a perspective view of the device.

In the construction illustrated there is a body portion which is formed of two pieces or plates 10 and 11 of sheet metal, which may be permanently secured together in any suitable manner. Merely as an example of such securing means I have shown the top plate or sheet metal piece 11 provided with lugs 12 folded around the edges of the lower plate or sheet metal piece 10. The plate 10 is flat so that it may be secured against any desired surface, while the member 11 has a raised portion 13. This includes a wall spaced from and parallel to the plate 10, and narrow vertical connecting walls. Between this raised portion and the plate 10 there is thus formed a passageway within which the other member of the device may slide. This other member is shown as a strip 14 of sheet metal with one end bent to form a glass-engaging portion 15, and the other end bent to form a finger-piece or handle. The glass-engaging portion 15 is preferably so bent as to present a curved surface which will not scratch the glass. This part may extend in a direction substantially at right angles to the length of the slide 14, and may be substantially hemispherical. The part 16 may extend at right angles to the slide 14, but in the opposite direction, and may have a reinforcing flange to stiffen it and prevent bending at the angle.

The slide 14 is provided with means for retaining it in operative position and for permitting it to be released from such means. As shown, particularly in Fig. 5, the slide has an aperture 17 adjacent to one end, and a pair of spaced slits forming an intermediate yielding tongue 18 adjacent to the other end. The top wall 13 of the guideway has a depending lug which presents a shoulder 19 so positioned that when the slide is moved inwardly to final position so that the part 15 yieldingly engages the glass, this shoulder may enter the aperture 17 of the slide and prevent the return movement of the latter. The height of the passageway through which the slide 14 moves is slightly greater than the thickness of the metal of the slide 14, so that this slide may have a movement toward and from the base plate 10. The spring tongue 18 bears down against the base plate 10 so as to normally hold the slide in raised position, that is, in engagement with the wall 13. In pushing the slide into position by pressing on the finger-piece 16, the spring tongue 18 holds the slide in such position that when the limit of movement has been reached the shoulder 19 enters the aperture 17 and locks the parts. When it is desired to withdraw the slide 14, pressure may be applied on the finger-piece 16 to force the slide toward the plate 10 against the action of the spring 18, and to thus disengage the slide from the shoulder 19. It will be noted that both the retaining shoulder 19 and the resilient means 18 which cause engagement of the shoulder are formed integral with the main members of the device.

The device may be secured in position in any suitable manner, as for instance by screws 20 through screw holes in the two plates at opposite sides of the guideway for the slide. These screws also serve to hold the two plates 10 and 11 together, but the lugs 12 prevent separation of the plates when the device is removed.

Due to the resiliency of the metal along the line where the part 15 joins the body of the slide 14, it will be apparent that it is not necessary to position the device with absolute accuracy. Upon moving the slide endwise, the part 15 may bend slightly until the shoulder 19 enters the aperture 17. The part 15 presents a curved surface at whatever angle it may be used. If it is found that it does not engage the glass with the proper force after the device has been applied, the slide may be moved out to its rearward position and the part 15 then bent outwardly so as to give it a different normal position in respect to the slide, and thus insure the proper engagement with the glass when the slide is forced back.

Having thus described my invention, what I claim as new and desire to secure by Letters Patent is:—

1. An anti-rattling device including a pair of sheet metal plates secured together and so formed as to provide a guideway therebetween, one of said plates having a lug projecting into said guideway and a slide movable in said guideway and having an aperture adapted to receive said lug, said slide being of less thickness than said guideway, and resilient means for holding said slide against the plate having said lug.

2. An anti-rattling device including a pair of sheet metal plates secured together and so formed as to provide a guideway therebetween, one of said plates having a shoulder projecting into said guideway, a slide movable in said guideway and having an aperture adapted to receive said shoulder, said slide being of less thickness than said guideway, and having an integral tongue for engagement with one plate to hold said slide against the other plate having said shoulder.

3. An anti-rattling device including a pair of sheet metal plates secured together and being so formed as to provide a guideway therebetween, a sheet metal slide mounted within said guideway and having one end bent at an angle to form a window-engaging portion and the other end bent at an angle to form a finger-piece, said slide intermediate of its ends having an integral tongue forming a spring to hold said slide against one of said plates, and said slide and said last mentioned plate having a pair of inter-engaging portions for normally preventing endwise movement of the slide in one direction.

4. An anti-rattling device including a guide member presenting a pair of parallel spaced walls forming a guideway therebetween, one of said walls having a projection extending into said guideway and a sheet metal plate slidable in said guideway, and having an aperture adapted to receive said projection, said plate being of less thickness than said guideway, and having a portion bent at an angle to the plate to form resilient means for holding the plate against the wall having said projection, said plate having a finger piece at one end and a window engaging portion at the other.

Signed at New York in the county of New York and State of New York this 26th day of May A. D. 1926.

SAMUEL BARUCH.